J. HAGEN.
BURNER.
APPLICATION FILED JUNE 3, 1921.
1,406,003. Patented Feb. 7, 1922.
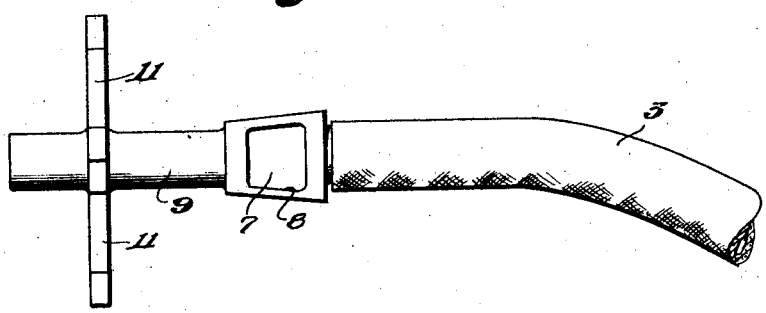
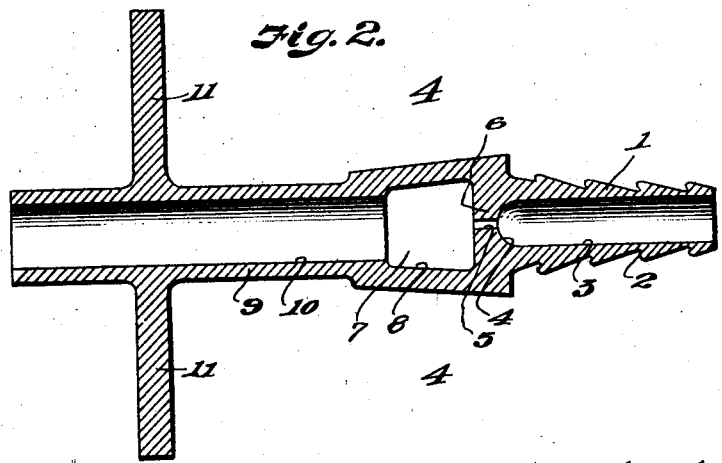
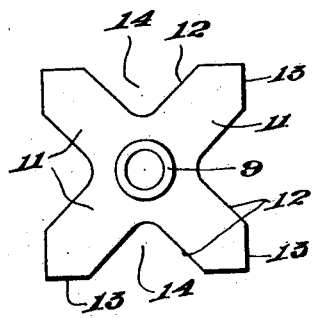
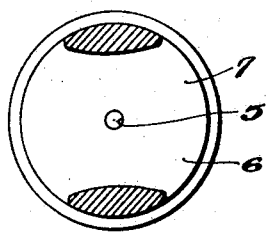
J. HAGEN, INVENTOR
BY Victor J. Evans
ATTORNEY

UNITED STATES PATENT OFFICE.

JOSEPH HAGEN, OF CHICAGO, ILLINOIS.

BURNER.

1,406,003.  Specification of Letters Patent.  Patented Feb. 7, 1922.

Application filed June 3, 1921. Serial No. 474,752.

*To all whom it may concern:*

Be it known that I, JOSEPH HAGEN, a citizen of the United States, residing at Chicago, in the county of Cook and State of Illinois, have invented new and useful Improvements in Burners, of which the following is a specification.

This invention relates to burners and more particularly to a combined brazing blow torch and soldering iron holder.

An object of the invention is to provide a burner as specified which is simple in construction, comprising a single piece of material, as well as one which may be attached to any ordinary or approved type of gas jet for guiding the flame and mixing air therewith to provide proper combustion.

A further object of this invention is to provide a burner as specified which has a plurality of transversely extending arms formed thereupon and disposed at right angles one to the other which arms serve the dual function of forming a support for the burner and also forming a support for a soldering iron or analogous tool, while the same is being heated.

A still further object of this invention is to provide a device as specified which is particularly adapted for use in small tool forging, tempering and drawing and annealing sheet metal, as well as one which may provide a handy and convenient soldering outfit for home use and which eliminates the use of a gasoline pump, torch or analogous device.

Other objects of the invention will appear in the following detailed description and in the accompanying drawings wherein:

Fig. 1 is a side elevation of the improved burner.

Fig. 2 is a longitudinal section through the burner.

Fig. 3 is an end elevation of the improved burner.

Fig. 4 is a section on the line 4—4 of Fig. 2.

Referring more particularly to the drawing the improved burner is cast all in one piece and comprises a nipple 1 having a corrugated perimeter or outer surface as shown at 2 to prevent a hose 3 from slipping off the nipple when the hose is employed in connecting the burner to an ordinary gas jet (not shown). The nipple 1 is provided with a bore 3 which terminates in a rounded end as at 4 and opens into a jet opening or bore 5 in the partition 6 which jet opening or bore 5 opens out into the mixing chamber 7. The mixing chamber 7 is relatively large and is provided with diametrically opposed relatively large openings to permit the entrance of air into the mixing chamber. The burner structure includes a tubular body 9 formed integrally with the walls of the mixing chamber 7 and extending longitudinally therefrom in alignment with the nipple 1. The bore 10 of the tubular body 9 opens into the mixing chamber 7 and out through the end of the tubular body remote from the mixing chamber as clearly shown in Fig. 2 of the drawing and the fuel is ignited in the use of the burner at the outer end of the tubular body 9. The force of gas passing through the burner structure will prevent back firing therein and will provide a jet of flame at the end of the burner which may be utilized for brazing, heating a soldering iron, tempering or drawing metal, small tool forging, annealing sheet metal and analogous purposes to which blow torches are put.

A plurailty of transversely extending arms 11 are formed upon the tubular body 1 a short distance inwardly of its outer open end and these arms extend at right angles to each other and diagonally of a square struck about their outer ends, said outer ends being cut at right angles one to the other and at 45' angles to the sides 12 of the arms. The angularly cut ends 13 provide flat edges for forming rests for the burner so as to permit it to be supported on a flat surface for supporting a soldering iron or analogous tool to be heated, which tool is supported in one of the substantially V shaped recesses 14 formed between the facing edges of adjacent arms 11.

From the foregoing description taken in connection with the accompanying drawing it will be seen that an improved burner or combined blow torch and soldering iron holder has been provided which is simple in construction and which embodies no complicated features to cause it to get out of order as well as one which may be used in machine shops, brass shops, by copper or silversmiths, for experimental work and numerous other purposes to which a burner of this type may be adapted.

It is, of course to be understood that the invention may be constructed in various other manners and the parts associated in different relations and therefore, I do not desire to be limited in any manner except as set forth in the claims hereunto appended.

Having thus described my invention what I claim is:

1. As a new article of manufacture a combined brazing torch and soldering iron holder comprising a tubular body having a nipple at one end thereof adapted for connection with a gas jet, a mixing chamber in said burner intermediate said body and nipple, and a plurality of transversely extending supporting arms formed upon said tubular body.

2. As a new article of manufacture a combined brazing torch and soldering iron holder comprising a tubular body having a nipple at one end thereof adapted for connection with a gas jet, a mixing chamber in said burner intermediate said body and nipple, and a plurality of transversely extending supporting arms formed upon said tubular body, said arms having their outer ends cut at obtuse angles relative to the edges of the supporting arms to present flat resting edges for engagement with a supporting surface.

3. As a new article of manufacture a combined brazing torch and soldering iron holder comprising a tubular body having a nipple on one end thereof adapted for connection with a gas jet, a mixing chamber in said burner intermediate said body and nipple, said nipple provided with a bore opening into said mixing chamber through a reduced jet opening, and a plurality of transversely extending supporting arms formed upon said tubular body.

4. As a new article of manufacture a burner or combined blow torch and soldering iron holder comprising a tubular body, a mixing chamber carried by said body, and a plurality of transversely extending arms formed upon said body and adapted to form supports for the body or a tool to be heated by flames issuing from the body.

In testimony whereof I affix my signature.

JOSEPH HAGEN.